US012395476B2

(12) United States Patent
Adolphe et al.

(10) Patent No.: US 12,395,476 B2
(45) Date of Patent: Aug. 19, 2025

(54) METHODS, SYSTEMS, APPARATUSES, AND DEVICES FOR FACILITATING SECURE UPDATING OF A MACHINE LEARNING MODEL

(71) Applicant: Forward Edge-AI, Inc., San Antonio, TX (US)

(72) Inventors: Eric Adolphe, San Antonio, TX (US); Elesha Marita Jackson, Ellicott City, MD (US); Matvei Popov, San Antonio, TX (US)

(73) Assignee: Forward Edge-AI, Inc., San Antonio, TX (US)

( * ) Notice: Subject to any disclaimer, the term of this patent is extended or adjusted under 35 U.S.C. 154(b) by 215 days.

(21) Appl. No.: 18/309,289

(22) Filed: Apr. 28, 2023

(65) Prior Publication Data

US 2024/0364670 A1 Oct. 31, 2024

(51) Int. Cl.
*H04L 9/40* (2022.01)
*G06F 21/60* (2013.01)
(Continued)

(52) U.S. Cl.
CPC ........ *H04L 63/0485* (2013.01); *G06F 21/606* (2013.01); *H04L 45/74* (2013.01);
(Continued)

(58) Field of Classification Search
CPC .................. H04L 63/0428; H04L 63/1416
See application file for complete search history.

(56) References Cited

U.S. PATENT DOCUMENTS 11,588,798 B1 * 2/2023 Cline .................. H04L 63/0272
12,199,958 B1   1/2025 Layton
(Continued)

FOREIGN PATENT DOCUMENTS

CN     203840359 U  *  9/2014
CN     113158179 A  *  7/2021 ........... G06F 21/554

OTHER PUBLICATIONS

Naeem Firdous Syed, Zubair Baig, Ahmed Ibrahim & Craig Valli (2020) Denial of service attack detection through machine learning for the IoT, Journal of Information and Telecommunication, 4:4, 482-503 (Year: 2020).*

(Continued)

*Primary Examiner* — Zhimei Zhu

(57) ABSTRACT

A system for facilitating secure updating of a machine learning model. The system includes a processing device and a first encryption device. The processing device generates a request and updates the machine learning model using an update. The first encryption device includes a first encryption unit and a first communication unit. The first encryption unit encrypts a native packet corresponding to the request and adds a connectionless header forming a first egressing connectionless datagram, decrypts a second encrypted native packet of an ingressing connectionless datagram to obtain the update. The first communication unit adds a complex header to the first egressing connectionless datagram for forming a first packet for delivery to a second encryption device, receives a second packet comprising the second encrypted native packet and a complex header from the second encryption device, removes the complex header and adds a connectionless header for forming the ingressing connectionless datagram.

18 Claims, 13 Drawing Sheets

(51) Int. Cl.
   *H04L 45/74* (2022.01)
   *G06N 20/00* (2019.01)
(52) U.S. Cl.
   CPC ...... *H04L 63/0428* (2013.01); *H04L 63/0471* (2013.01); *H04L 63/1416* (2013.01); *G06N 20/00* (2019.01)

(56) References Cited

U.S. PATENT DOCUMENTS

| | | |
|---|---|---|
| 2019/0166152 A1 | 5/2019 | Steele |
| 2022/0272122 A1* | 8/2022 | Kaabouch ........... H04W 12/122 |
| 2023/0138458 A1* | 5/2023 | Wei ....................... H04L 63/145 |
| | | 726/23 |

OTHER PUBLICATIONS

Thakkar, A., Lohiya, R. A Review on Machine Learning and Deep Learning Perspectives of IDS for IoT: Recent Updates, Security Issues, and Challenges. Arch Computat Methods Eng 28, 3211-3243 (2021) (Year: 2021).*

Gnanavel, S., Narayana, K. E., Jayashree, K., Nancy, P., Teressa, Dawit Mamiru, Implementation of Block-Level Double Encryption Based on Machine Learning Techniques for Attack Detection and Prevention, Wireless Communications and Mobile Computing, 2022, 4255220, 9 pages (Year: 2022).*

M. Mushtaq et al., "Whisper: A Tool for Run-Time Detection of Side-Channel Attacks," in IEEE Access, vol. 8, pp. 83871-83900, 2020 (Year: 2020).*

* cited by examiner

METHODS, SYSTEMS, APPARATUSES, AND DEVICES FOR FACILITATING SECURE UPDATING OF A MACHINE LEARNING MODEL

FIELD OF THE INVENTION

Generally, the present disclosure relates to the field of data processing. More specifically, the present disclosure relates to methods, systems, apparatuses, and devices for facilitating secure updating of a machine learning model.

BACKGROUND OF THE INVENTION

Existing techniques for updating machine learning models are deficient with regard to several aspects. For instance, current technologies do not provide secure receiving of the updates for the machine learning models. As a result, different technologies are needed that securely receive the updates. Furthermore, current technologies do not rate machine learning models and request updates for a particular machine learning model. As a result, different technologies are needed that rate the machine learning models as accurate and state and request updated for a stale machine learning model.

Therefore, there is a need for improved methods, systems, apparatuses, and devices for facilitating secure updating of a machine learning model that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating secure updating of a machine learning model, in accordance with some embodiments. Accordingly, the system may include a processing device and a first encryption device. Further, the processing device may be configured for generating at least one request for updating at least one machine learning model. Further, the processing device may be configured for updating the at least one machine learning model based on at least one update. Further, the first encryption device may be communicatively coupled with the processing device. Further, the first encryption device may include a first encryption unit and a first communication unit. Further, the first encryption unit may be configured for encrypting a native packet corresponding to the at least one request received from the processing device using an encryption key to create a first encrypted native packet. Further, the first encryption unit may be configured for adding a connectionless header to the first encrypted native packet to form a first egressing connectionless datagram. Further, the first encryption unit may be configured for decrypting a second encrypted native packet of an ingressing connectionless datagram using the encryption key to obtain the at least one update for the at least one machine learning model. Further, the first communication unit may be communicatively coupled with the first encryption unit. Further, the first communication unit may be paired with a second communication unit of a second encryption device. Further, the first communication unit may be configured for adding a complex header to the first egressing connectionless datagram for forming a first packet for delivery to the second encryption device. Further, the first communication unit may be configured for receiving a second packet comprising the second encrypted native packet and a complex header from the second encryption device. Further, the first communication unit may be configured for removing the complex header from the second packet. Further, the first communication unit may be configured for adding a connectionless header to the second packet for forming the ingressing connectionless datagram. Further, the ingressing connectionless datagram may include the second encrypted native packet.

Further disclosed herein is a system for facilitating secure updating of a machine learning model, in accordance with some embodiments. Accordingly, the system may include a processing device and a first encryption device. Further, the processing device may be configured for generating at least one request for updating at least one machine learning model. Further, the processing device may be configured for updating the at least one machine learning model based on at least one update. Further, the first encryption device may be communicatively coupled with the processing device. Further, the first encryption device may include a first encryption unit and a first communication unit. Further, the first encryption unit may be configured for encrypting a native packet corresponding to the at least one request received from the processing device using an encryption key to create a first encrypted native packet. Further, the first encryption unit may be configured for adding a connectionless header to the first encrypted native packet to form a first egressing connectionless datagram. Further, the first encryption unit may be configured for decrypting a second encrypted native packet of an ingressing connectionless datagram using the encryption key to obtain the at least one update for the at least one machine learning model. Further, the first communication unit may be communicatively coupled with the first encryption unit. Further, the first communication unit may be paired with a second communication unit of a second encryption device. Further, the first communication unit may be configured for adding a complex header to the first egressing connectionless datagram for forming a first packet for delivery to the second encryption device. Further, the first communication unit may be configured for receiving a second packet comprising the second encrypted native packet and a complex header from the second encryption device. Further, the first communication unit may be configured for removing the complex header from the second packet. Further, the first communication unit may be configured for adding a connectionless header to the second packet for forming the ingressing connectionless datagram. Further, the ingressing connectionless datagram may include the second encrypted native packet. Further, the second encryption device may be communicatively coupled with at least one second device. Further, the second encryption device may include the second communication unit and a second encryption unit. Further, the second communication unit may be configured for receiving the first packet comprising the first encrypted native packet and a complex header from the first encryption device. Further, the second communication unit may be configured for removing the complex header from the first packet. Further, the second communication unit may be configured for adding a connectionless header to the first packet for forming an ingressing connectionless datagram. Further, the ingressing connectionless datagram may include the first encrypted native packet. Further, the second communication unit may be configured for adding a complex header to an egressing connectionless datagram for forming the second packet for delivery to the first encryption device. Further, the second encryption unit may be communicatively coupled with the second communication unit. Further, the second encryption unit may be configured for decrypting the first encrypted native packet of the ingressing connectionless datagram using the encryption key to obtain the at least one request from the at least one first device. Further, the second encryption unit may be configured for encrypting the at least one update received from the at least one second device using the encryption key to create the second encrypted native packet. Further, the at least one second device may be configured for providing the at least one update for the at least one machine learning model based on the at least one request. Further, the second encryption unit may be configured for adding a connectionless header to the second encrypted native packet to form an egressing connectionless datagram.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTIONS OF THE INVENTION

Figure 1:
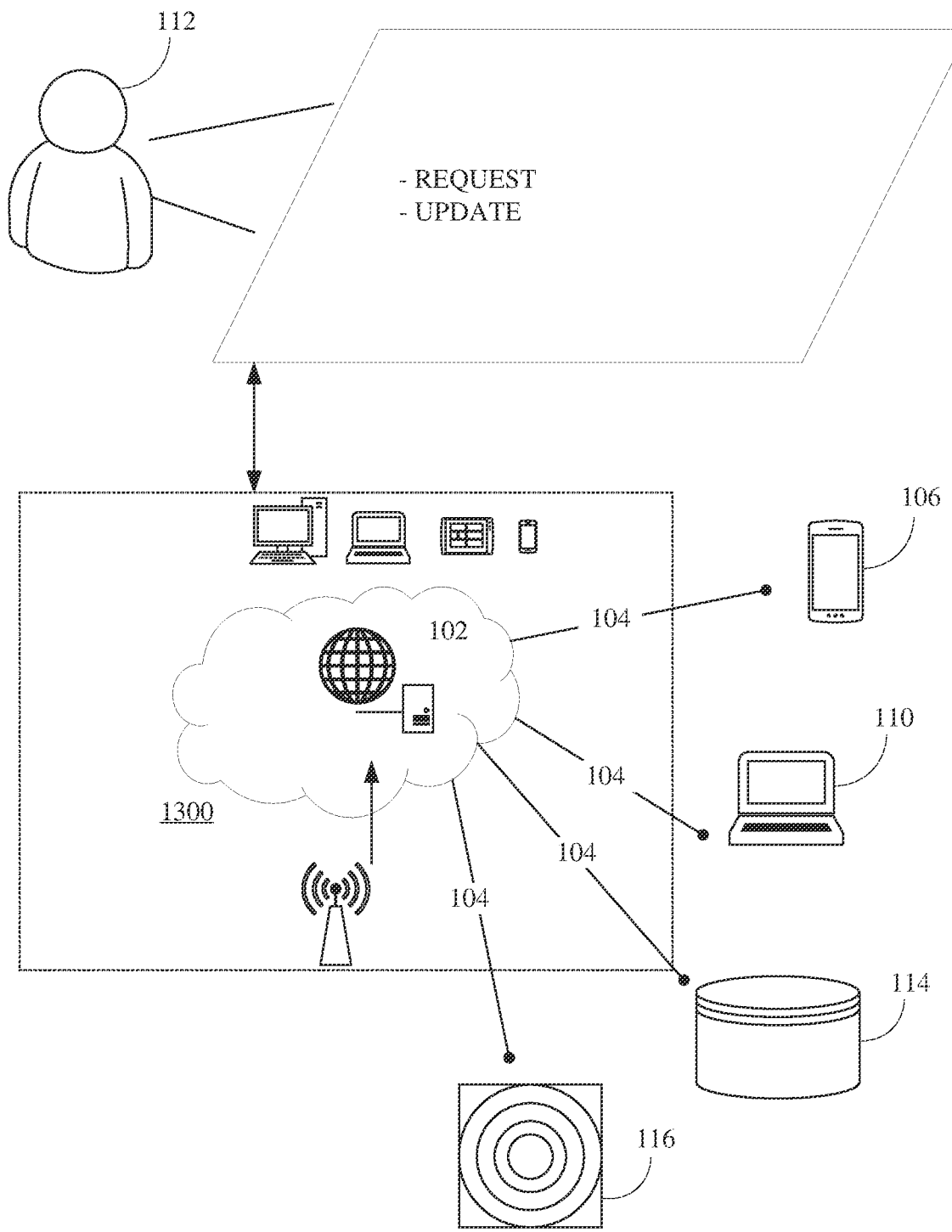
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating secure updating of a machine learning model, embodiments of the present disclosure are not limited to use only in this context.

In general, the method disclosed herein may be performed by one or more computing devices. For example, in some embodiments, the method may be performed by a server computer in communication with one or more client devices over a communication network such as the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, minicomputer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device (encryption unit) configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device (communication unit) configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, and a representative thereof. Further, the user as defined herein may refer to a human, an individual, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, associated with a device corresponding to the performance of the one or more steps, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

Further, the present disclosure describes methods, systems, apparatuses, and devices for facilitating secure updating of a machine learning model. Further, the disclosed system implements a protocol free encryption device (PFED) (see U.S. patent application Ser. No. 17/200,468, entitled "PROTOCOL FREE ENCRYPTING DEVICE," filed Mar. 12, 2021; incorporated herein by reference). Further, the PFED incorporated in the disclosed system may be an encrypting device. Further, two encrypting devices are paired to provide communications between two trusted elements via an untrusted network. Further, any device in a network address space may be a trusted element. Further, the network address space may be a subnet in an enterprise network. Further, the device may include a smartphone, a tablet, a laptop, a desktop, a router, etc. are examples of devices in a network address space.

Further, each of the trusted elements, includes an interface, for receiving a trusted interconnect, providing a wired connection between the two encrypting devices, and the trusted element, thereby providing communications between the trusted element and the encrypting device. Further, the encrypting devices are associated with the trusted elements via trusted interconnects. Further, the two encrypting devices need to be paired to allow communication between the trusted elements.

Each sending trusted element generates native packets to be received by another trusted element. Further, the native packets may take any form that would allow the native packets to normally travel between the trusted elements without encrypting devices. Further, the native packets may include a data packet riding in a frame, an IP packet riding in an Ethernet frame, etc. Further, each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent; Each encryption unit is configured with a key for encrypting and decrypting messages. For trusted elements to communicate, the encryption unit's keys of the two encrypting devices must match.

The encryption devices include interfaces and a one-way interface. Each interface may include an Ethernet port, a serial port, or a USB port. Further, the interfaces may be in communication with the trusted element interface of the trusted element via the trusted interconnect, e.g., an Ethernet cable, a serial wire, or a USB cable. Further, the interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows for instructions generated by the encryption unit to be signaled to the communication unit. Further, the instructions may instruct the communication unit to halt operations.

Further, the passive interface and an active/addressable interface are both included in each communication unit. Through the connectionless interconnection, the passive interface of the communication unit of one encrypting device is in contact with the second passive interface of the encryption unit of the other encrypting device. The address is linked to the active/addressable interface. To transmit any packets from the passive interface into a form that will be routable to the other communication unit of the paired PFED, the communication unit of one encrypting device is paired with the communication unit of the other encrypting device. The Internet or other untrusted networks are used for communications between communication units. Further, the native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encryption device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the encrypting device), the untrusted network routes the packet as necessary. A connectionless header is added to the connectionless datagram to create an incoming connectionless datagram after the communication unit of the encrypting device removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are totally separate from one another. No information is shared about the other. This is meant by "protocol-free". Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

Further, the present disclosure describes a system facilitating secure updating of machine learning models. Further, the system may include a model aggregator device and an encryption device. Further, the model aggregator device provides updates for machine learning models based on requests. Further, the machine learning models are modified, updated, replaced, etc. using the updates. Further, the encryption device may be communicatively coupled with the processing device. Further, the encryption device may include an encryption unit and a communication unit. Further, the encryption unit may be configured for encrypting a native packet corresponding to an update received from the model aggregator device using an encryption key to create an encrypted native packet. Further, the encryption unit may be configured for adding a connectionless header to the encrypted native packet to form an egressing connectionless datagram. Further, the encryption unit may be configured for decrypting a second encrypted native packet of an ingressing connectionless datagram using the encryption key to obtain a request for updating a machine learning model. Further, the communication unit may be communicatively coupled with the encryption unit. Further, the communication unit may be paired with a paired communication unit of a paired encryption device. Further, the communication unit may be configured for adding a complex header to the egressing connectionless datagram for forming a first packet for delivery to the paired encryption device. Further, the communication unit may be configured for receiving a second packet comprising the second encrypted native packet and a complex header from the paired encryption device. Further, the communication unit may be configured for removing the complex header from the second packet. Further, the communication unit may be configured for adding a connectionless header to the second packet for forming the ingressing connectionless datagram. Further, the ingressing connectionless datagram may include the second encrypted native packet.

FIG. 1 is an illustration of an online platform 100 consistent with various embodiments of the present disclosure. By way of non-limiting example, the online platform 100 to facilitate secure updating of a machine learning model may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1300.

Figure 2:
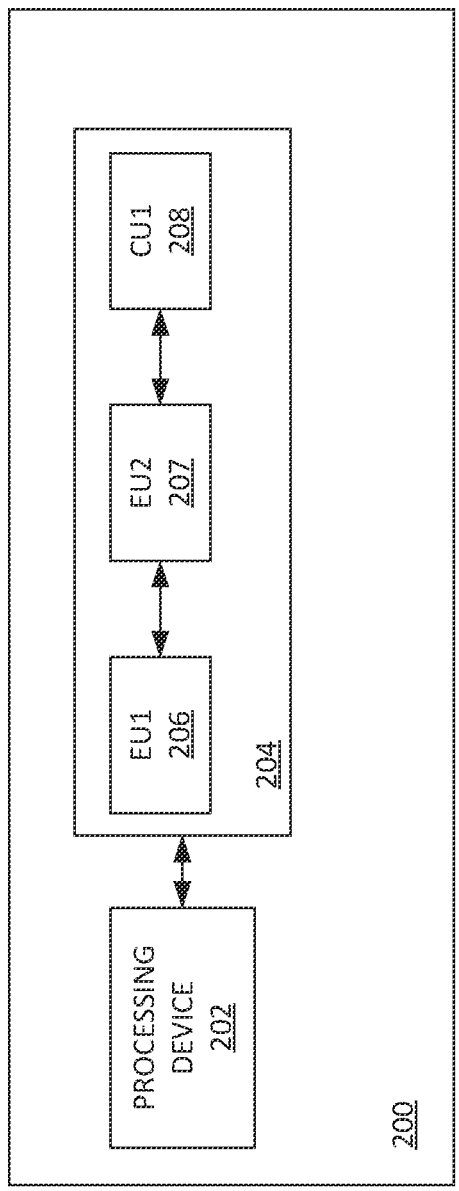
FIG. 2 is a block diagram of a system 200 for facilitating secure updating of a machine learning model, in accordance with some embodiments.

FIG. 2 is a block diagram of a system 200 for facilitating secure updating of a machine learning model, in accordance with some embodiments. Accordingly, the system 200 may include a processing device 202 and a first encryption device 204.

Further, the processing device 202 may be configured for generating at least one request for updating at least one machine learning model. Further, the at least one request may include an identifier of the at least one machine learning model. Further, the at least one request may include at least one problem with the at least one machine learning model that needed to be fixed. Further, the processing device 202 may be configured for updating the at least one machine learning model based on at least one update. Further, the updating may include modifying parameters, replacing segments, removing segments, etc., of one of the at least one machine learning model.

Figure 3:
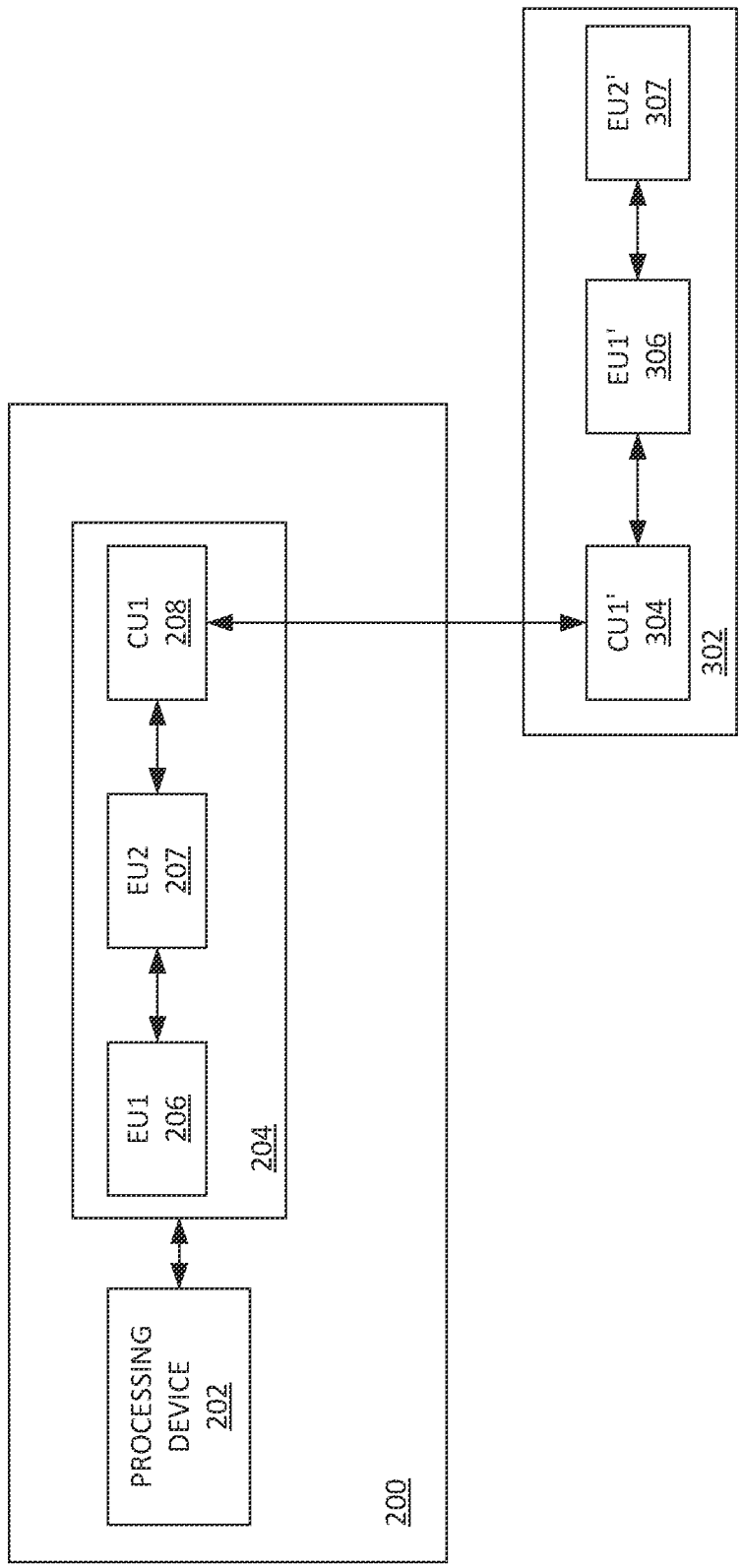
FIG. 3 is a block diagram of the system 200 with the second encryption device 302, in accordance with some embodiments.

Further, the first encryption device 204 may be communicatively coupled with the processing device 202. Further, the first encryption device 204 may include a first encryption unit (encryption unit1 (EU1) 206 and encryption unit2 (EU2) 207) and a first communication unit (communication unit1 (CU1) 208). Further, the first encryption unit (encryption unit1 (EU1) 206 and encryption unit2 (EU2) 207) and the first communication unit (communication unit1 (CU1) 208) are communicatively coupled.). Further, the first encryption unit (encryption unit1 (EU1) 206 and encryption unit2 (EU2) 207) and the first communication unit (communication unit1 (CU1) 208) may be computing devices. Further, the first encryption unit (encryption unit1 (EU1) 206 and encryption unit2 (EU2) 207) may be configured for encrypting a native packet corresponding to the at least one request received from the processing device 202 using an encryption key to create a first encrypted native packet. Further, the first encryption unit (encryption unit1 (EU1) 206 and encryption unit2 (EU2) 207) may be configured for adding a connectionless header to the first encrypted native packet to form a first egressing connectionless datagram. Further, the first encryption unit (encryption unit1 (EU1) 206 and encryption unit2 (EU2) 207) may be configured for decrypting a second encrypted native packet of an ingressing connectionless datagram using the encryption key to obtain the at least one update for the at least one machine learning model. Further, the first communication unit (communication unit1 (CU1) 208) may be communicatively coupled with the first encryption unit (encryption unit1 (EU1) 206 and encryption unit2 (EU2) 207). Further, the first communication unit (communication unit1 (CU1) 208) may be paired with a second communication unit (communication unit1'(CU1') 304) of a second encryption device 302, as shown in FIG. 3. Further, the first communication unit (communication unit1 (CU1) 208) may be configured for adding a complex header to the first egressing connectionless datagram for forming a first packet for delivery to the second encryption device 302. Further, the first communication unit (communication unit1 (CU1) 208) may be configured for receiving a second packet comprising the second encrypted native packet and a complex header from the second encryption device 302. Further, the first communication unit (communication unit1 (CU1) 208) may be configured for removing the complex header from the second packet. Further, the first communication unit (communication unit1 (CU1) 208) may be configured for adding a connectionless header to the second packet for forming the ingressing connectionless datagram. Further, the ingressing connectionless datagram may include the second encrypted native packet.

Figure 4:
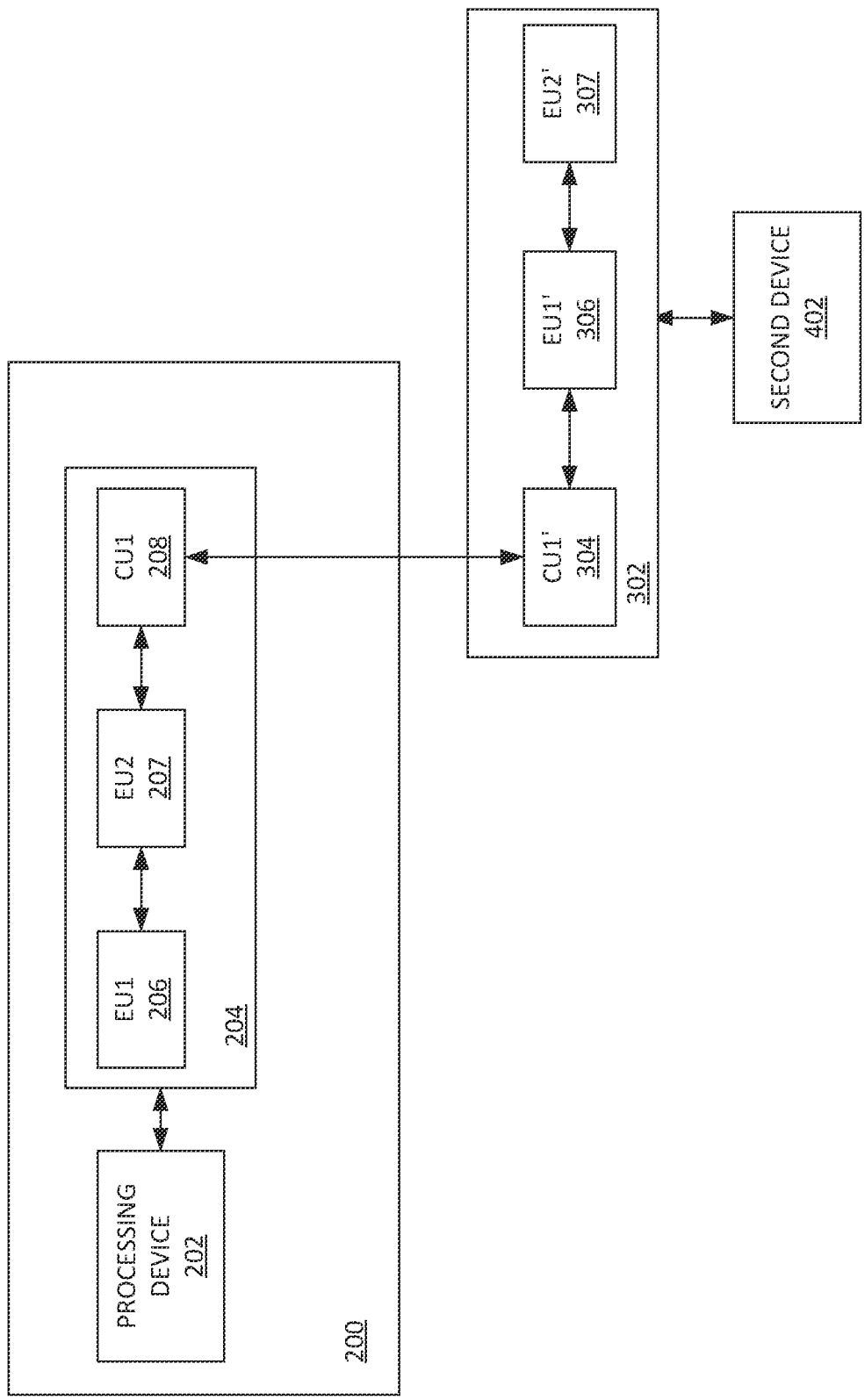
FIG. 4 is a block diagram of the system 200 with the second encryption device 302, in accordance with some embodiments.

Further, in some embodiments, the second encryption device 302 may be communicatively coupled with at least one second device 402, as shown in FIG. 4. Further, the second encryption device 302 may include the second communication unit (communication unit1'(CU1') 304) and a second encryption unit (encryption unit1' (EU1') 306 and encryption unit2' (EU2') 307). Further, the second communication unit (communication unit1'(CU1') 304) and the second encryption unit (encryption unit1' (EU1') 306 and encryption unit2' (EU2') 307) may be computing devices. Further, the second communication unit (communication unit1'(CU1') 304) may be configured for receiving the first packet comprising the first encrypted native packet and a complex header from the first encryption device 204. Further, the second communication unit (communication unit1' (CU1') 304) may be configured for removing the complex header from the first packet. Further, the second communication unit (communication unit1'(CU1') 304) may be configured for adding a connectionless header to the first packet for forming an ingressing connectionless datagram. Further, the ingressing connectionless datagram may include the first encrypted native packet. Further, the second communication unit (communication unit1'(CU1') 304) may be configured for adding a complex header to an egressing connectionless datagram for forming the second packet for delivery to the first encryption device 204. Further, the second encryption unit (encryption unit1' (EU1') 306 and encryption unit2' (EU2') 307) may be communicatively coupled with the second communication unit (communication unit1'(CU1') 304). Further, the second encryption unit (encryption unit1' (EU1') 306 and encryption unit2' (EU2') 307) may be configured for decrypting the first encrypted native packet of the ingressing connectionless datagram using the encryption key to obtain the at least one request from the at least one first device. Further, the second encryption unit (encryption unit1' (EU1') 306 and encryption unit2' (EU2') 307) may be configured for encrypting the at least one update received from the at least one second device 402 using the encryption key to create the second encrypted native packet. Further, the second encryption unit (encryption unit1' (EU1') 306 and encryption unit2' (EU2') 307) may be configured for adding a connectionless header to the second encrypted native packet to form an egressing connectionless datagram.

Further, in an embodiment, the at least one second device 402 may be configured for providing the at least one update for the at least one machine learning model based on the at least one request. Further, the at least one second device 402 may include a model aggregator/supplier device. Further, the at least one second device 402 provides the at least one update via a blockchain device associated with a blockchain network.

Figure 5:
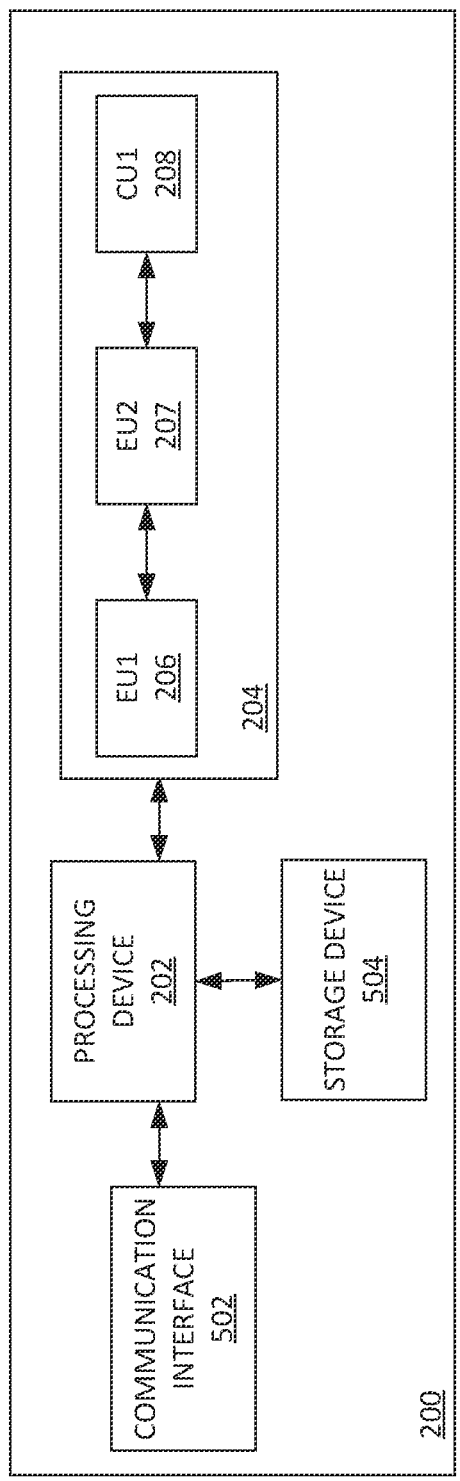
FIG. 5 is a block diagram of the system 200 comprising the at least one communication interface 502 and the storage device 504, in accordance with some embodiments.
Figure 6:
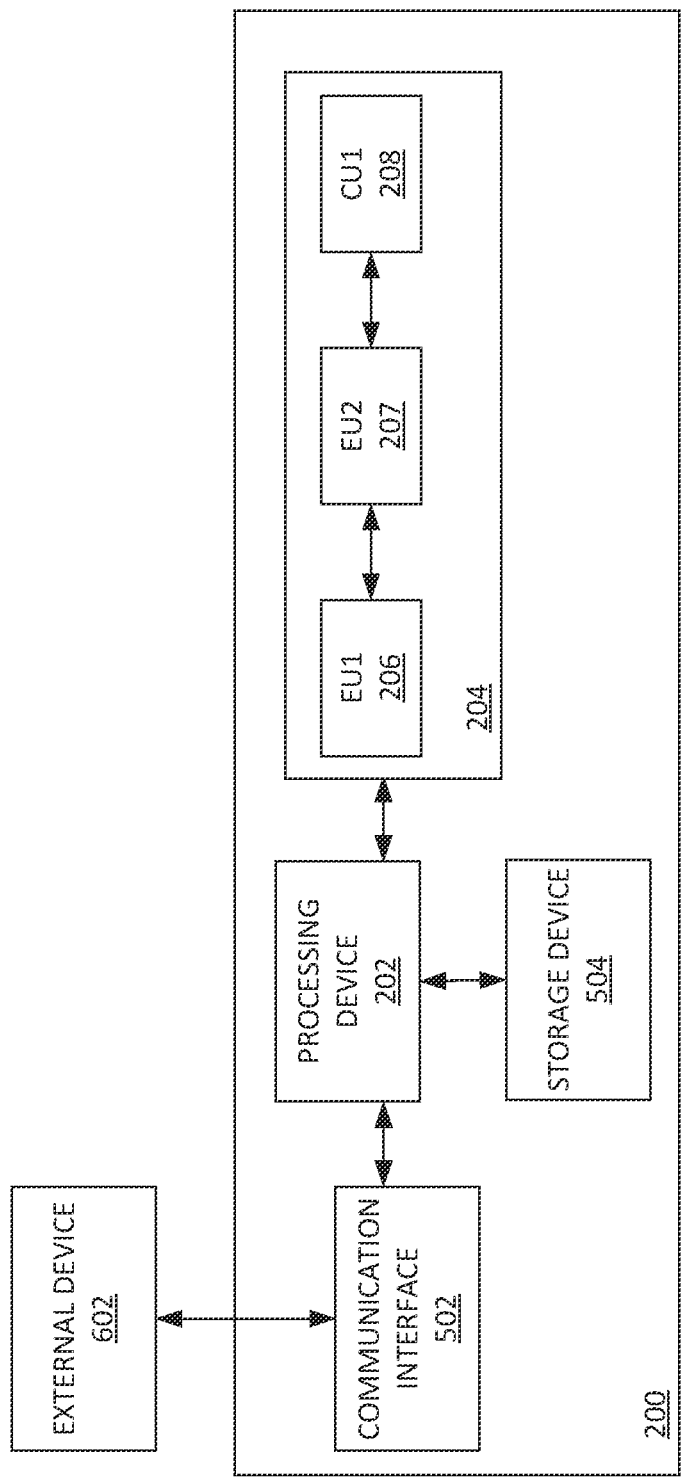
FIG. 6 is a block diagram of the system 200 comprising the at least one communication interface 502 and the storage device 504 with the at least one external device 602, in accordance with some embodiments.

In further embodiments, the system 200 may include at least one communication interface 502 and a storage device 504, as shown in FIG. 5. Further, the at least one communication interface may include a network interface module, a network interface device, etc. Further, the at least one communication interface 502 may be configured for receiving at least one signal associated with at least one external device 602, as shown in FIG. 6, and the first encryption device 204. Further, the at least one signal corresponds to the data associated with at least one network traffic between the at least one external device 602 and the first encryption device 202. Further, the at least one external device 602 may be a computing device, a client device, etc. Further, the processing device 202 may be communicatively coupled with the at least one communication interface 502. Further, the processing device 202 may be configured for analyzing the at least one signal using a set of machine learning models from a plurality of machine learning models. Further, the processing device 202 may be configured for determining an attack associated with the first encryption device 204 based on the analyzing of the at least one signal. Further, the processing device 202 may be configured for generating an alert for the attack based on the determining of the attack. Further, the processing device 202 may be configured for generating a performance indicator for each of the plurality of machine learning models based on the determining of the attack. Further, the performance indicator determines an acuteness of each of the plurality of machine learning models in detecting the attack. Further, the generating of the at least one request may be further based on the performance indicator for each of the plurality of machine learning models. Further, the storage device 504 may be communicatively coupled with the processing device 202. Further, the storage device 504 may be configured for storing the plurality of machine learning models. Further, in an embodiment, each machine learning model of the set of machine learning models separately detects anomalies in the at least one signal by using multivariate signal analysis. Further, the determining of the attack may be further based on the anomalies detected by each machine learning model of the set of machine learning models. Further, the determining of the attack may include predicting the attack in a future time based on the anomalies detected by each machine learning model of the set of machine learning models.

Further, in an embodiment, the storage device 504 may be further configured for retrieving a previous performance indicator of each of the plurality of machine learning models. Further, the processing device 202 may be configured for analyzing the previous performance indicator of each of the plurality of machine learning models. Further, the processing device 202 may be configured for identifying the set of machine learning models from the plurality of machine learning models based on the analyzing of the previous performance indicator. Further, the analyzing of the at least one signal using the set of machine learning models may be further based on the identifying.

Further, in an embodiment, the processing device 202 may be further configured for identifying the at least one machine learning model from the plurality of machine learning models based on the performance indicator of each of the plurality of machine learning models. Further, the generating of the at least one request may be further based on the identifying.

Further, in an embodiment, the generating of the performance indicator of each of the plurality of machine learning models may be further based on the updating. Further, the updating improves the performance indicator of a machine learning model.

Further, in an embodiment, each machine learning model of the set of machine learning models separately generates a degree of confidence associated with an occurrence of the attack. Further, the determining of the attack may be further based on the degree of confidence associated with the occurrence of the attack generated by each machine learning model of the set of machine learning models. Further, the degree of confidence corresponds to an acuteness of each machine learning model of the set of machine learning models in detecting anomalies in the at least one signal by using multivariate signal analysis.

Further, in an embodiment, the generating of the performance indicator for each of the plurality of machine learning models may be further based on the degree of confidence associated with the occurrence of the attack generated by each machine learning model of the set of machine learning models.

Figure 7:
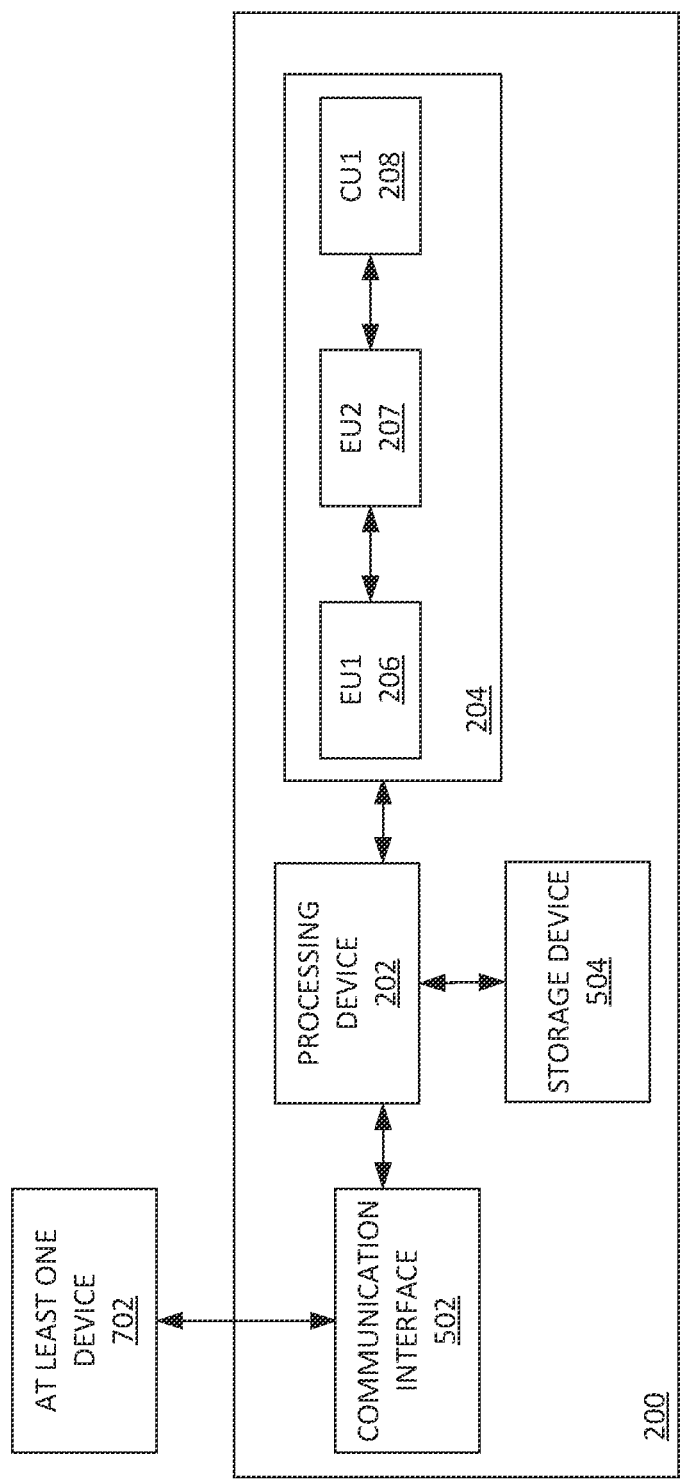
FIG. 7 is a block diagram of the system 200 comprising the at least one communication interface 502 and the storage device 504 with the at least one device 702, in accordance with some embodiments.

Further, in an embodiment, the at least one communication interface 502 may be further configured for receiving a confirmation of the attack from at least one device 702, as shown in FIG. 7. Further, the at least one device 702 may include a computing device, a client device, etc. Further, the confirmation may include a human confirmation of the attack by an individual. Further, the processing device 202 may be further configured for analyzing the confirmation of the attack and the degree of confidence associated with the occurrence of the attack generated by each machine learning model of the set of machine learning models. Further, the generating of the performance indicator for each of the plurality of machine learning models may be further based on the analyzing of the confirmation of the attack and the degree of confidence associated with the attack generated by each machine learning model of the set of machine learning models.

Further, in an embodiment, the at least one communication interface 502 may be further configured for receiving a selection of machine learning models of the plurality of machine learning models from at least one input device. Further, the at least one input device may include a computing device, a client device, etc. Further, the processing device 202 may be further configured for identifying the set of machine learning models based on the selection of machine learning models.

Further, in an embodiment, the processing device 202 may be configured for analyzing the plurality of machine learning models based on at least one criterion and the at least one request. Further, the at least one criterion may include efficiency, speed, accuracy, CPU consumption, latency, etc. in performing multivariate signal analysis. Further, the processing device 202 may be configured for identifying the set of machine learning models from the plurality of machine learning models based on the analyzing of the plurality of machine learning models. Further, the analyzing of the at least one signal using the set of machine learning models may be further based on the identifying.

FIG. 3 is a block diagram of the system 200 with the second encryption device 302, in accordance with some embodiments.

FIG. 4 is a block diagram of the system 200 with the second encryption device 302, in accordance with some embodiments.

FIG. 5 is a block diagram of the system 200 comprising the at least one communication interface 502 and the storage device 504, in accordance with some embodiments.

FIG. 6 is a block diagram of the system 200 comprising the at least one communication interface 502 and the storage device 504 with the at least one external device 602, in accordance with some embodiments.

FIG. 7 is a block diagram of the system 200 comprising the at least one communication interface 502 and the storage device 504 with the at least one device 702, in accordance with some embodiments.

Figure 8:
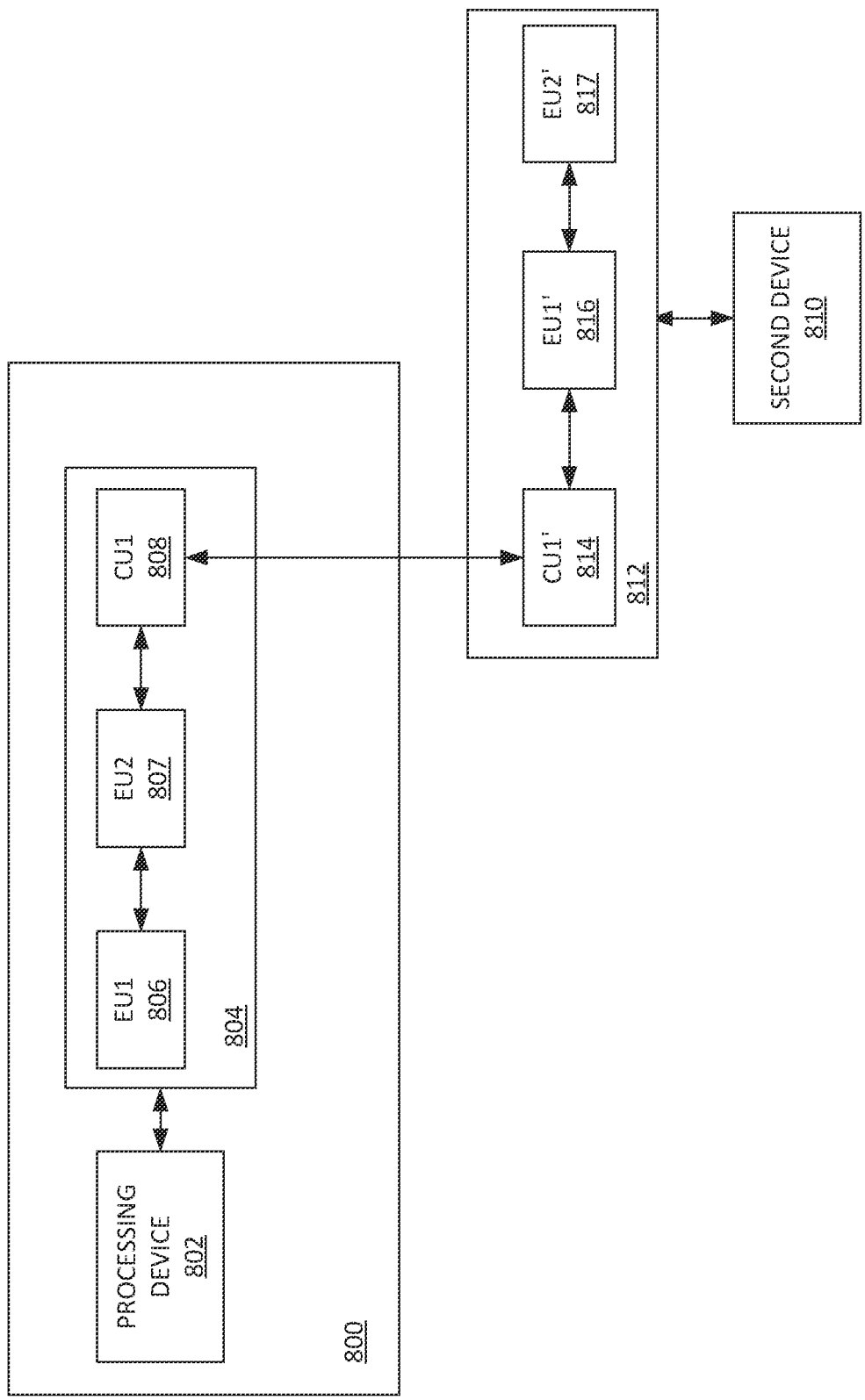
FIG. 8 is a block diagram of a system 800 for facilitating secure updating of a machine learning model, in accordance with some embodiments.

FIG. 8 is a block diagram of a system 800 for facilitating secure updating of a machine learning model, in accordance with some embodiments. Accordingly, the system 800 may include a processing device 802 and a first encryption device 804.

Further, the processing device 802 may be configured for generating at least one request for updating at least one machine learning model. Further, the processing device 802 may be configured for updating the at least one machine learning model based on at least one update.

Further, the first encryption device 804 may be communicatively coupled with the processing device 802. Further, the first encryption device 804 may include a first encryption unit (encryption unit1 (EU1) 806 and encryption unit2 (EU2) 807) and a first communication unit (communication unit1 (CU1) 808). Further, the first encryption unit (encryption unit1 (EU1) 806 and encryption unit2 (EU2) 807) may be configured for encrypting a native packet corresponding to the at least one request received from the processing device 802 using an encryption key to create a first encrypted native packet. Further, the first encryption unit (encryption unit1 (EU1) 806 and encryption unit2 (EU2) 807) may be configured for adding a connectionless header to the first encrypted native packet to form a first egressing connectionless datagram. Further, the first encryption unit (encryption unit1 (EU1) 806 and encryption unit2 (EU2) 807) may be configured for decrypting a second encrypted native packet of an ingressing connectionless datagram using the encryption key to obtain the at least one update for the at least one machine learning model. Further, the first communication unit (communication unit1 (CU1) 808) may be communicatively coupled with the first encryption unit (encryption unit1 (EU1) 806 and encryption unit2 (EU2) 807). Further, the first communication unit (communication unit1 (CU1) 808) may be paired with a second communication unit (communication unit1'(CU1') 814) of a second encryption device 812. Further, the first communication unit (communication unit1 (CU1) 808) may be configured for adding a complex header to the first egressing connectionless datagram for forming a first packet for delivery to the second encryption device 812. Further, the first communication unit (communication unit1 (CU1) 808) may be configured for receiving a second packet comprising the second encrypted native packet and a complex header from the second encryption device 812. Further, the first communication unit (communication unit1 (CU1) 808) may be configured for removing the complex header from the second packet. Further, the first communication unit (communication unit1 (CU1) 808) may be configured for adding a connectionless header to the second packet for forming the ingressing connectionless datagram. Further, the ingressing connectionless datagram may include the second encrypted native packet. Further, the second encryption device 812 may be communicatively coupled with at least one second device 810. Further, the second encryption device 812 may include the second communication unit (communication unit1'(CU1') 814) and a second encryption unit (encryption unit1' (EU1') 816 and encryption unit2' (EU2') 817). Further, the second communication unit (communication unit1' (CU1') 814) may be configured for receiving the first packet comprising the first encrypted native packet and a complex header from the first encryption device 804. Further, the second communication unit (communication unit1'(CU1') 814) may be configured for removing the complex header from the first packet. Further, the second communication unit (communication unit1'(CU1') 814) may be configured for adding a connectionless header to the first packet for forming an ingressing connectionless datagram. Further, the ingressing connectionless datagram may include the first encrypted native packet. Further, the second communication unit (communication unit1'(CU1') 814) may be configured for adding a complex header to an egressing connectionless datagram for forming the second packet for delivery to the first encryption device 804. Further, the second encryption unit (encryption unit1' (EU1') 816 and encryption unit2' (EU2') 817) may be communicatively coupled with the second communication unit (communication unit1'(CU1') 814). Further, the second encryption unit (encryption unit1' (EU1') 816 and encryption unit2' (EU2') 817) may be configured for decrypting the first encrypted native packet of the ingressing connectionless datagram using the encryption key to obtain the at least one request from the at least one first device. Further, the second encryption unit (encryption unit1' (EU1') 816 and encryption unit2' (EU2') 817) may be configured for encrypting the at least one update received from the at least one second device 810 using the encryption key to create the second encrypted native packet. Further, the at least one second device 810 may be configured for providing the at least one update for the at least one machine learning model based on the at least one request. Further, the second encryption unit (encryption unit1' (EU1') 816 and encryption unit2' (EU2') 817) may be configured for adding a connectionless header to the second encrypted native packet to form an egressing connectionless datagram.

In further embodiments, the system 800 may include at least one communication interface and a storage device. Further, the at least one communication interface may be configured for receiving at least one signal associated with at least one external device and the first encryption device 804. Further, the processing device 802 may be communicatively coupled with the at least one communication interface. Further, the processing device 802 may be configured for analyzing the at least one signal using a set of machine learning models from a plurality of machine learning models. Further, the processing device 802 may be configured for determining an attack associated with the first encryption device 804 based on the analyzing of the at least one signal. Further, the processing device 802 may be configured for generating an alert for the attack based on the determining of the attack. Further, the processing device 802 may be configured for generating a performance indicator for each of the plurality of machine learning models based on the determining of the attack. Further, the generating of the at least one request may be further based on the performance indicator for each of the plurality of machine learning models. Further, the storage device may be communicatively coupled with the processing device 802. Further, the storage device may be configured for storing the plurality of machine learning models.

Further, in an embodiment, the storage device may be further configured for retrieving a previous performance indicator of each of the plurality of machine learning models. Further, the processing device 802 may be configured for analyzing the previous performance indicator of each of the plurality of machine learning models. Further, the processing device 802 may be configured for identifying the set of machine learning models from the plurality of machine learning models based on the analyzing of the previous performance indicator. Further, the analyzing of the at least one signal using the set of machine learning models may be further based on the identifying.

Further, in an embodiment, the processing device 802 may be further configured for identifying the at least one machine learning model from the plurality of machine learning models based on the performance indicator of each of the plurality of machine learning models. Further, the generating of the at least one request may be further based on the identifying.

Further, in an embodiment, the generating of the performance indicator of each of the plurality of machine learning models may be further based on the updating.

Further, in an embodiment, each machine learning model of the set of machine learning models separately generates a degree of confidence associated with an occurrence of the attack. Further, the determining of the attack may be further based on the degree of confidence associated with the occurrence of the attack generated by each machine learning model of the set of machine learning models.

Further, in an embodiment, the at least one communication interface may be further configured for receiving a selection of machine learning models of the plurality of machine learning models from at least one input device.

Further, the processing device 802 may be further configured for identifying the set of machine learning models based on the selection of machine learning models.

Further, in an embodiment, the processing device 802 may be configured for analyzing the plurality of machine learning models based on at least one criterion and the at least one request. Further, the processing device 802 may be configured for identifying the set of machine learning models from the plurality of machine learning models based on the analyzing of the plurality of machine learning models. Further, the analyzing of the at least one signal using the set of machine learning models may be further based on the identifying.

Figure 9:
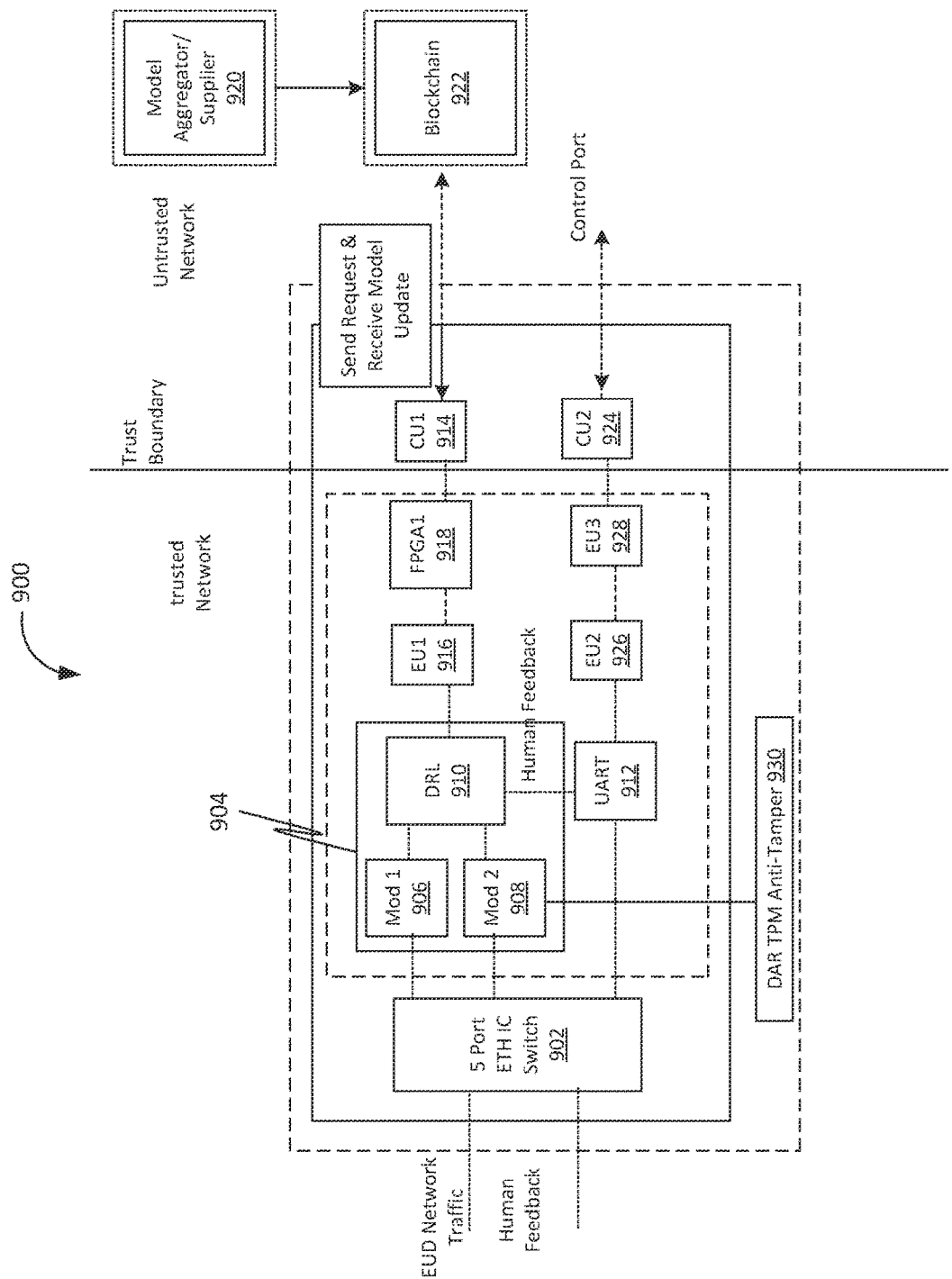
FIG. 9 is a block diagram of an apparatus 900 for facilitating secure and remote updating of a machine learning model, in accordance with some embodiments.

FIG. 9 is a block diagram of an apparatus 900 for facilitating secure and remote updating of a machine learning model, in accordance with some embodiments. Accordingly, the apparatus 900 may include a communication interface 902 (five port Ethernet IC switch). Further, the communication interface 902 may receive at least one network traffic associated with at least one external user device (EUD) associated with the apparatus 900. Further, the apparatus 900 may include a processor 904 (AD) comprising a Mod 1 (906), a Mod 2 (908), and a deep reinforcement learning (DRL) algorithm 910. Further, the processor 904 is an SoC (system on chip). Further, the Mod 1 (906) and the Mod 2 (908) may be machine learning models. Further, the processor 904 uses the Mod 1 (906) and Mod 2 (908) to analyze data associated with the at least one network traffic to identify anomalies. Further, the Mod 1 (906) and Mod 2 (908) may disagree on the occurrence of an attack based on the anomalies. Further, the processor 904 analyzes results from the Mod 1 (906) and Mod 2 (908) using the DRL algorithm 910 against a human feedback received at the communication interface 902. Further, the DRL algorithm 910 compares the result with the human feedback to reward accurate models by increasing bias for these models and reducing the bias of stale models that produce an inaccurate result. Further, the human feedback is relayed to the processor 904 from the communication interface 902 via Universal asynchronous receiver-transmitter (UART) 912. Further, the processor 904 may include Application-Specific Integrated Circuit/Graphics processing unit (ASIC/GPU). Further, the processor 904 may be coupled with a first communication unit (CU1) 914 via a first encryption unit (EU1) 916 and a Field Programmable Gate Array (FPGA) 918. Further, based on results obtained by analyzing using the DRL algorithm 910, the DRL algorithm 910 negatively biases the machine learning model with the poorest results. When the machine learning model confidence drops below 90 percent, the DRL algorithm 910 will request through the secure channel (CU1 914), a model update to replace the machine learning model (Mod 1 or Mod 2) that is underperforming. Further, the CU1 914 sends a request to a model aggregator 920 via a blockchain device 922 and receives an update for the machine learning model from the model aggregator 920 via the blockchain device 922. Further, the Blockchain device 922 brokers the transaction of the request and the update. Further, the update is stored in a permissioned blockchain associated with the blockchain device 922. Further, the model aggregator 920 continuously delivers the updates to the blockchain device 922. Further, a transaction associated with the request is written to the permissioned blockchain hash and a transaction hash. Further, the CU1 914 does not accept the transaction if the update is not requested, and the transaction number is not in a ledger of the blockchain device 922. Further, the processor 904 may be coupled with a second communication unit (CU2) 924 via the UART 912, a second encryption unit (EU2) 926, and a third encryption unit (EU3) 928. Further, the CU2 may be coupled with a control port. Further, the apparatus 900 may include a network interface device (NID) (communication interface) that is coupled with the CU1 914. Further, the NID sends requests for updates for the machine learning model, decrypts the updates, removes noise, and drops updates that are not requested. Further, the apparatus 900 may include DAR TPM anti-tamper 930. Further, the apparatus 900 may be associated with a trust boundary dividing the apparatus 900 between a trusted zone having a trusted network and an untrusted zone having an untrusted network.

Figure 10:
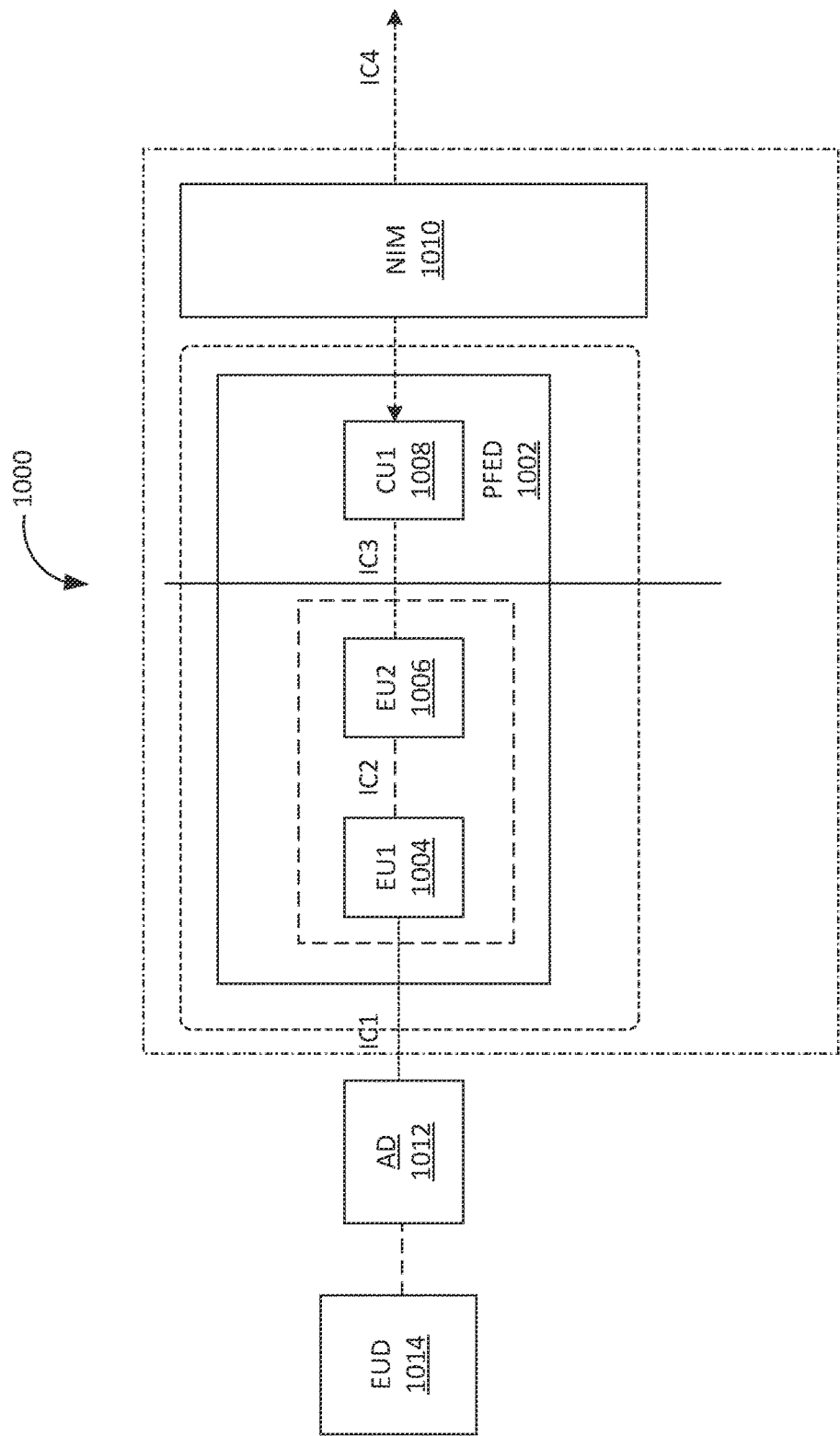
FIG. 10 is a block diagram of an encryption device 1000 for detecting anomalies with an anomaly detector (AD) 1012, in accordance with some embodiments.

FIG. 10 is a block diagram of an encryption device 1000 for detecting anomalies with an anomaly detector (AD) 1012, in accordance with some embodiments. Further, the encryption device 1000 may be an Isidore Quantum device. Further, the encryption device 1000 may include a protocol free encryption device (PFED) 1002, and a network interface module (NIM)/network interface device (NID) 1010. Further, the network interface module (NIM) 1010 may include an Ethernet interface, a USB interface, a Wi-Fi interface, a Radio interface, a SATCOM interface, a Bluetooth interface, etc. Further, the protocol free encryption device (PFED) 1002 may include a first encryption unit (EU1) 1004 and a second encryption unit (EU2) 1006, and a communication unit (CU1) 1008. Further, the protocol free encryption device (PFED) 1002 may be galvanically isolated using a galvanic isolator. Further, the galvanic isolator may provide galvanic isolation of data and power channel (pins) to the PFED 1002. Further, the protocol free encryption device (PFED) 1002 and the galvanic isolator may be encased inside a Faraday cage. Further, the protocol free encryption device (PFED) 1002, the galvanic isolator, and the Faraday cage may be encased inside an outer resin/plastic cage. Further, the encryption device 1000 may be associated with an external user device (EUD) 1014. Further, the AD 1012 may include a processing device (such as the processing device 202, etc.) to analyze the data associated with at least one network traffic from the EUD 1014 to the encryption device 1000 using different machine learning models. Further, each of the machine learning models detects the anomalies. Further, the AD 1012 may report the anomalies.

Figure 11:
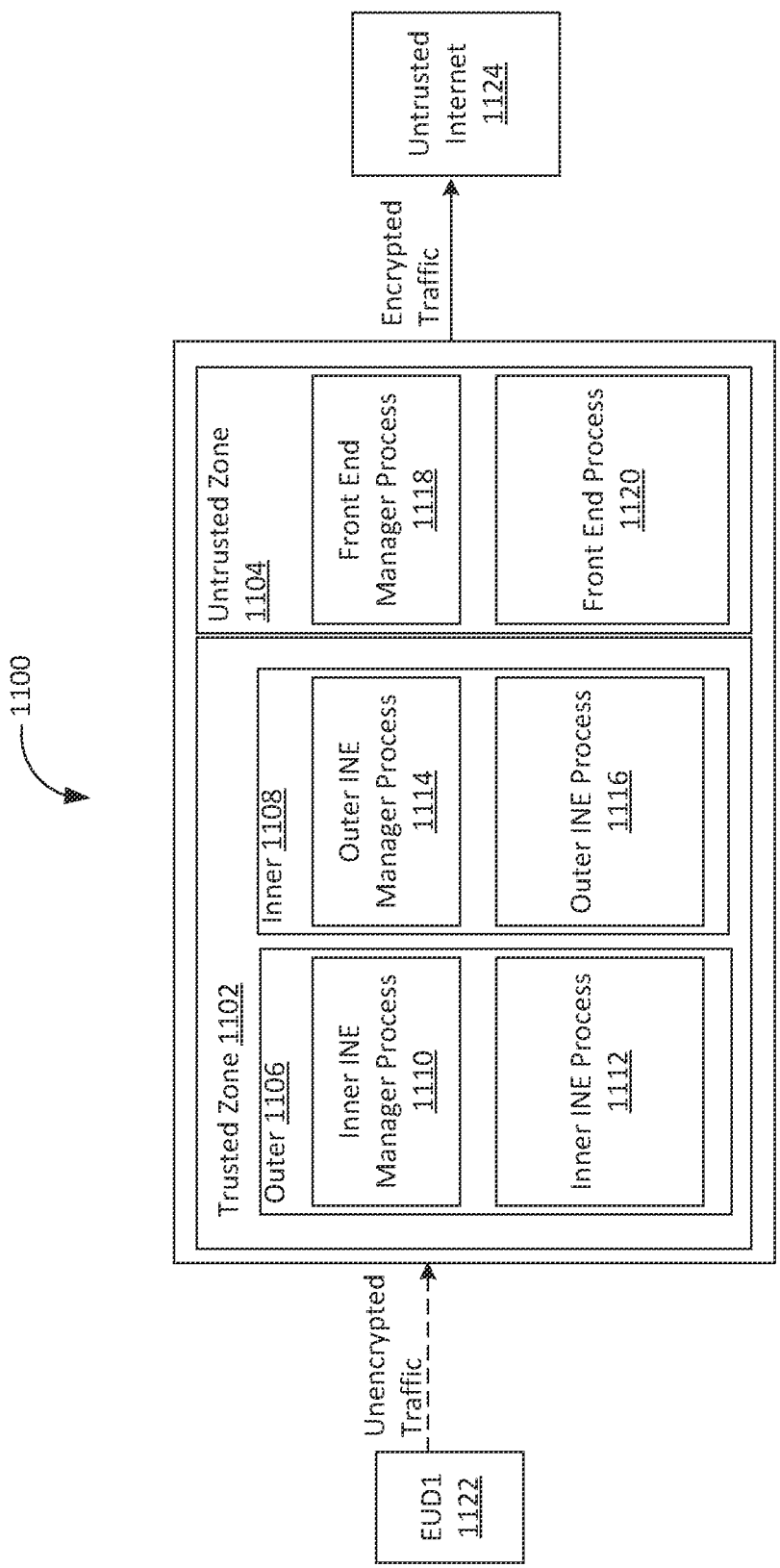
FIG. 11 is a block diagram representing a software application associated with an Isidore device 1100, in accordance with some embodiments.

FIG. 11 is a block diagram representing a software application associated with an Isidore device 1100, in accordance with some embodiments. Further, the software application of the Isidore device 1100 may include a trusted zone 1102 and an untrusted zone 1104. Further, the trusted zone 1102 may include an outer trusted zone 1106 and an inner trusted zone 1108. Further, the outer trusted zone 1106 may include an inner inline network encryptor (INE) manager process 1110 and an inner INE process 1112. Further, the inner trusted zone 1108 may include an outer INE manager process 1114 and an outer INE process 1116. Further, the untrusted zone 1104 may include a front-end manager process 1118 and a front end process 1120. Further, the software application of the Isidore device 1100 may receive unencrypted traffic from a first external user device (EUD1) 1122. Further, the software application of the Isidore device 1100 may transmit encrypted traffic to the untrusted internet 1124.

Figure 12:
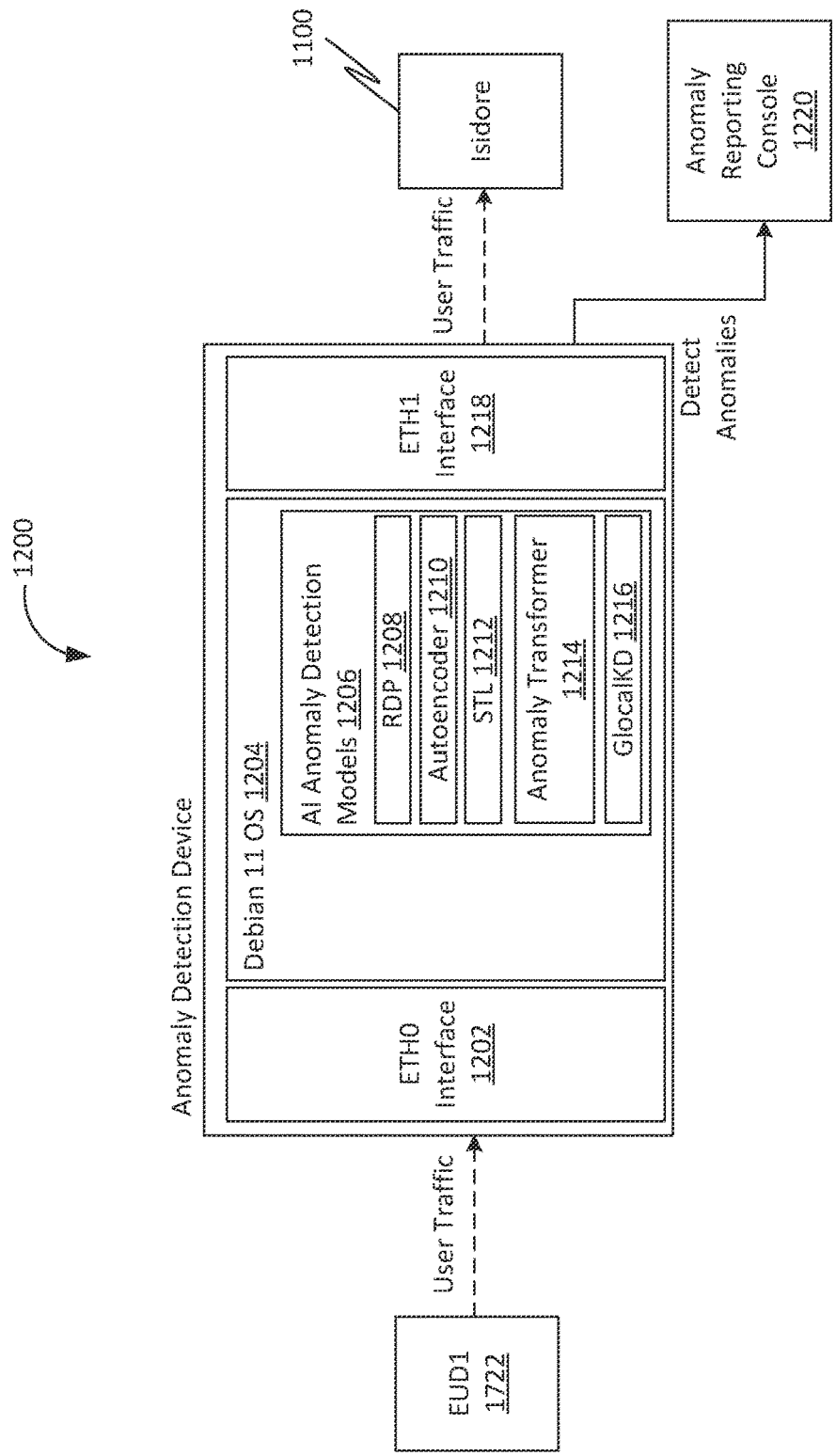
FIG. 12 is a block diagram of an anomaly detector (AD) 1200 for the Isidore device 1100, in accordance with some embodiments.

FIG. 12 is a block diagram of an anomaly detector (AD) 1200 for the Isidore device 1100, in accordance with some embodiments. Further, the anomaly detector (AD) 1200 may include a first interface (ETH0 interface) 1202, a processor (Debian 11 OS) 1204, and a second interface (ETH1 interface) 1218. Further, the processor (Debian 11 OS) 1204 may include AI anomaly detection models 1206 comprising RDP 1208, Autoencoder 1210, STL 1212, Anomaly Transformer 1214, and GlocalKD 1216. Further, the anomaly detector (AD) 1200 may receive user traffic from the first external user device (EUD1) 1122. Further, the anomaly detector (AD) 1200 may transmit the user traffic which is unencrypted to the Isidore device 1100. Further, the anomaly detector (AD) 1200 may detect anomalies and report the anomalies to the anomaly reporting console 1220.

Figure 13:
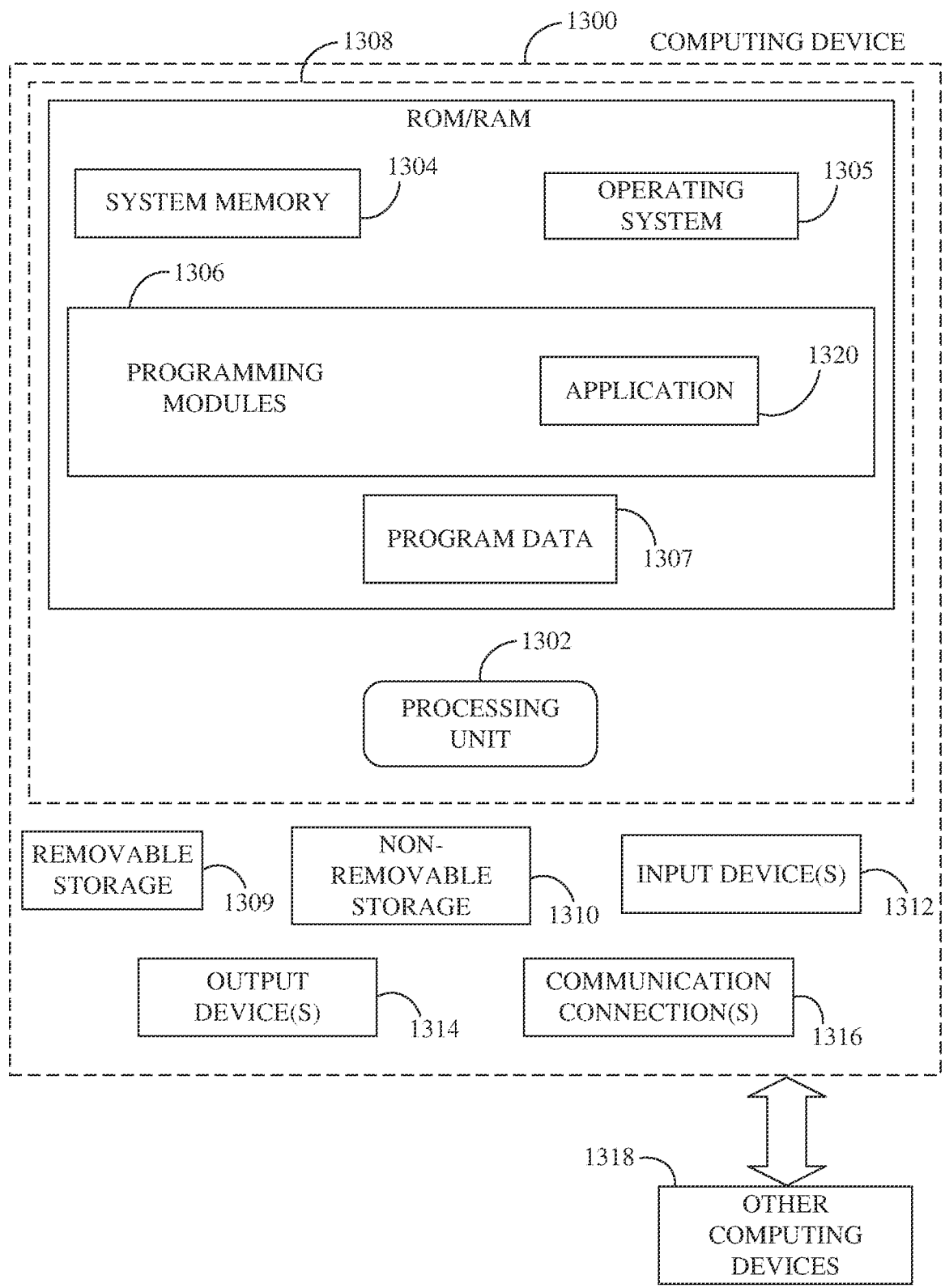
FIG. 13 is a block diagram of a computing device for implementing the methods disclosed herein, in accordance with some embodiments.

With reference to FIG. 13, a system consistent with an embodiment of the disclosure may include a computing device or cloud service, such as computing device 1300. In a basic configuration, computing device 1300 may include at least one processing unit 1302 and a system memory 1304. Depending on the configuration and type of computing device, system memory 1304 may comprise, but is not limited to, volatile (e.g., random-access memory (RAM)), non-volatile (e.g., read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, a location sensor, a camera, a biometric sensor, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., application 1320 such as a media player) may perform processes including, for example, one or more stages of methods, algorithms, systems, applications, servers, databases as described above. The aforementioned process is an example, and processing unit 1302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for facilitating secure updating of a machine learning model, the system comprising:
   a processing device configured for:
      generating at least one request for updating at least one machine learning model; and
      updating the at least one machine learning model based on at least one update; and
   a first encryption device communicatively coupled with the processing device, wherein the first encryption device comprises:

a first encryption unit configured for:
  encrypting a native packet corresponding to the at least one request received from the processing device using an encryption key to create a first encrypted native packet;
  adding a connectionless header to the first encrypted native packet to form a first egressing connectionless datagram; and
  decrypting a second encrypted native packet of an ingressing connectionless datagram using the encryption key to obtain the at least one update for the at least one machine learning model; and
a first communication unit communicatively coupled with the first encryption unit, wherein the first communication unit is paired with a second communication unit of a second encryption device, wherein the first communication unit is configured for:
  adding a complex header to the first egressing connectionless datagram for forming a first packet for delivery to the second encryption device;
  receiving a second packet comprising the second encrypted native packet and a complex header from the second encryption device;
  removing the complex header from the second packet; and
  adding a connectionless header to the second packet for forming the ingressing connectionless datagram, wherein the ingressing connectionless datagram comprises the second encrypted native packet; and
at least one communication interface configured for receiving at least one signal associated with at least one external device and the first encryption device, wherein the processing device is communicatively coupled with the at least one communication interface, wherein the processing device is further configured for:
analyzing the at least one signal using a set of machine learning models from a plurality of machine learning models;
determining an attack associated with the first encryption device based on the analyzing of the at least one signal;
generating an alert for the attack based on the determining of the attack; and
generating a performance indicator for each of the plurality of machine learning models based on the determining of the attack, wherein the generating of the at least one request is further based on the performance indicator for each of the plurality of machine learning models; and
a storage device communicatively coupled with the processing device, wherein the storage device is configured for storing the plurality of machine learning models.

2. The system of claim 1, wherein the second encryption device is communicatively coupled with at least one second device, wherein the second encryption device comprises:
the second communication unit configured for:
  receiving the first packet comprising the first encrypted native packet and a complex header from the first encryption device;
  removing the complex header from the first packet;
  adding a connectionless header to the first packet for forming an ingressing connectionless datagram, wherein the ingressing connectionless datagram comprises the first encrypted native packet; and
  adding a complex header to an egressing connectionless datagram for forming the second packet for delivery to the first encryption device; and
a second encryption unit communicatively coupled with the second communication unit, wherein the second encryption unit is configured for:
  decrypting the first encrypted native packet of the ingressing connectionless datagram using the encryption key to obtain the at least one request from the at least one first processing device;
  encrypting the at least one update received from the at least one second device using the encryption key to create the second encrypted native packet; and
  adding a connectionless header to the second encrypted native packet to form an egressing connectionless datagram.

3. The system of claim 2, wherein the at least one second device is configured for providing the at least one update for the at least one machine learning model based on the at least one request.

4. The system of claim 1, wherein the storage device is further configured for retrieving a previous performance indicator of each of the plurality of machine learning models, wherein the processing device is further configured for:
  analyzing the previous performance indicator of each of the plurality of machine learning models; and
  identifying the set of machine learning models from the plurality of machine learning models based on the analyzing of the previous performance indicator, wherein the analyzing of the at least one signal using the set of machine learning models is further based on the identifying.

5. The system of claim 1, wherein the processing device is further configured for identifying the at least one machine learning model from the plurality of machine learning models based on the performance indicator of each of the plurality of machine learning models, wherein the generating of the at least one request is further based on the identifying.

6. The system of claim 1, wherein the generating of the performance indicator of each of the plurality of machine learning models is further based on the updating.

7. The system of claim 1, wherein each machine learning model of the set of machine learning models separately generates a degree of confidence associated with an occurrence of the attack, wherein the determining of the attack is further based on the degree of confidence associated with the occurrence of the attack generated by each machine learning model of the set of machine learning models.

8. The system of claim 7, wherein the generating of the performance indicator for each of the plurality of machine learning models is further based on the degree of confidence associated with the occurrence of the attack generated by each machine learning model of the set of machine learning models.

9. The system of claim 7, wherein the at least one communication interface is further configured for receiving a confirmation of the attack from at least one device, wherein the processing device is further configured for analyzing the confirmation of the attack and the degree of confidence associated with the occurrence of the attack generated by each machine learning model of the set of machine learning models, wherein the generating of the performance indicator for each of the plurality of machine learning models is further based on the analyzing of the confirmation of the attack and the degree of confidence associated with the attack generated by each machine learning model of the set of machine learning models.

10. The system of claim 1, wherein the at least one communication interface is further configured for receiving a selection of machine learning models of the plurality of machine learning models from at least one input device, wherein the processing device is further configured for identifying the set of machine learning models based on the selection of machine learning models.

11. The system of claim 1, wherein the processing device is further configured for:
analyzing the plurality of machine learning models based on at least one criterion and the at least one request; and
identifying the set of machine learning models from the plurality of machine learning models based on the analyzing of the plurality of machine learning models, wherein the analyzing of the at least one signal using the set of machine learning models is further based on the identifying.

12. A system for facilitating secure updating of a machine learning model, the system comprising:
a processing device configured for:
generating at least one request for updating at least one machine learning model; and
updating the at least one machine learning model based on at least one update; and
a first encryption device communicatively coupled with the processing device, wherein the first encryption device comprises:
a first encryption unit configured for:
encrypting a native packet corresponding to the at least one request received from the processing device using an encryption key to create a first encrypted native packet;
adding a connectionless header to the first encrypted native packet to form a first egressing connectionless datagram; and
decrypting a second encrypted native packet of an ingressing connectionless datagram using the encryption key to obtain the at least one update for the at least one machine learning model; and
a first communication unit communicatively coupled with the first encryption unit, wherein the first communication unit is paired with a second communication unit of a second encryption device, wherein the first communication unit is configured for:
adding a complex header to the first egressing connectionless datagram for forming a first packet for delivery to the second encryption device;
receiving a second packet comprising the second encrypted native packet and a complex header from the second encryption device;
removing the complex header from the second packet; and
adding a connectionless header to the second packet for forming the ingressing connectionless datagram, wherein the ingressing connectionless datagram comprises the second encrypted native packet, wherein the second encryption device is communicatively coupled with at least one second device, wherein the second encryption device comprises:
the second communication unit configured for:
receiving the first packet comprising the first encrypted native packet and a complex header from the first encryption device;
removing the complex header from the first packet;
adding a connectionless header to the first packet for forming an ingressing connectionless datagram, wherein the ingressing connectionless datagram comprises the first encrypted native packet; and
adding a complex header to an egressing connectionless datagram for forming the second packet for delivery to the first encryption device; and
a second encryption unit communicatively coupled with the second communication unit, wherein the second encryption unit is configured for:
decrypting the first encrypted native packet of the ingressing connectionless datagram using the encryption key to obtain the at least one request from the processing device;
encrypting the at least one update received from the at least one second device using the encryption key to create the second encrypted native packet, wherein the at least one second device is configured for providing the at least one update for the at least one machine learning model based on the at least one request; and
adding a connectionless header to the second encrypted native packet to form an egressing connectionless datagram; and
at least one communication interface configured for receiving at least one signal associated with at least one external device and the first encryption device, wherein the processing device is communicatively coupled with the at least one communication interface, wherein the processing device is configured for:
analyzing the at least one signal using a set of machine learning models from a plurality of machine learning models;
determining an attack associated with the first encryption device based on the analyzing of the at least one signal;
generating an alert for the attack based on the determining of the attack; and
generating a performance indicator for each of the plurality of machine learning models based on the determining of the attack, wherein the generating of the at least one request is further based on the performance indicator for each of the plurality of machine learning models; and
a storage device communicatively coupled with the processing device, wherein the storage device is configured for storing the plurality of machine learning models.

13. The system of claim 12, wherein the storage device is further configured for retrieving a previous performance indicator of each of the plurality of machine learning models, wherein the processing device is further configured for:
analyzing the previous performance indicator of each of the plurality of machine learning models; and
identifying the set of machine learning models from the plurality of machine learning models based on the analyzing of the previous performance indicator, wherein the analyzing of the at least one signal using the set of machine learning models is further based on the identifying.

14. The system of claim 12, wherein the processing device is further configured for identifying the at least one machine learning model from the plurality of machine learning models based on the performance indicator of each of the plurality of machine learning models, wherein the generating of the at least one request is further based on the identifying.

15. The system of claim 12, wherein the generating of the performance indicator of each of the plurality of machine learning models is further based on the updating.

16. The system of claim 12, wherein each machine learning model of the set of machine learning models separately generates a degree of confidence associated with an occurrence of the attack, wherein the determining of the attack is further based on the degree of confidence associated with the occurrence of the attack generated by each machine learning model of the set of machine learning models.

17. The system of claim 12, wherein the at least one communication interface is further configured for receiving a selection of machine learning models of the plurality of machine learning models from at least one input device, wherein the processing device is further configured for identifying the set of machine learning models based on the selection of machine learning models.

18. The system of claim 12, wherein the processing device is further configured for:
- analyzing the plurality of machine learning models based on at least one criterion and the at least one request; and
- identifying the set of machine learning models from the plurality of machine learning models based on the analyzing of the plurality of machine learning models, wherein the analyzing of the at least one signal using the set of machine learning models is further based on the identifying.

* * * * *